United States Patent [19]

Galbert

[11] 4,176,390
[45] Nov. 27, 1979

[54] LIGHT

[75] Inventor: David R. Galbert, Cincinnati, Ohio

[73] Assignee: Galbert-French, Inc., Lisle, Ill.

[21] Appl. No.: 765,727

[22] Filed: Feb. 4, 1977

[51] Int. Cl.² .............................. B62J 5/00; B62J 5/16
[52] U.S. Cl. ....................................... 362/72; 362/78;
340/134; 200/60; 200/61.45 R; 200/80 R
[58] Field of Search ........................ 240/7.55, 7.66, 58;
340/134; 200/61.53, 61.52, 61.46, 61.45 R, 80
R, 60; 362/72

[56] References Cited
U.S. PATENT DOCUMENTS

| 2,811,633 | 10/1957 | Bjork | 362/72 |
| 3,154,776 | 10/1964 | Otten | 200/61.45 R |
| 3,987,409 | 10/1976 | Freeman | 340/134 |

Primary Examiner—Samuel W. Engle
Assistant Examiner—Edward F. Miles

Attorney, Agent, or Firm—Wood, Herron & Evans

[57] ABSTRACT

An improved light adapted to be connected to a wheel of, e.g., a bicycle. In preferred form, the light is fixed to the wheel in a manner that orients the light's battery on an axis positioned substantially radially of the wheel, and that orients the light's battery radially inward of the light's bulb relative to the wheel's axis. A switch spring is provided in the light's housing that normally biases the battery out of electrical contact with the bulb when the wheel is not rotating, i.e., when the bicycle is not in use, but which permits the battery to be biased into electrical contact with the bulb in response to centrifugal force when the wheel is rotating, i.e., when the bicycle is in use. Thus, the light turns off automatically when the bicycle is not being ridden, and turns on automatically in response to centrifugal force when the bicycle is being ridden, when the light is mounted on a bicycle's wheel.

17 Claims, 8 Drawing Figures

U.S. Patent  Nov. 27, 1979  Sheet 1 of 2  4,176,390
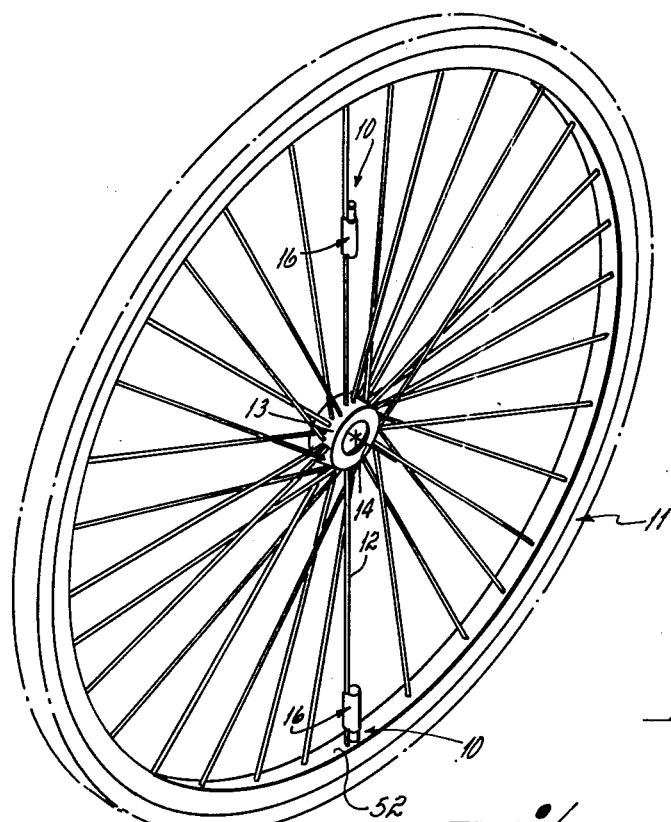
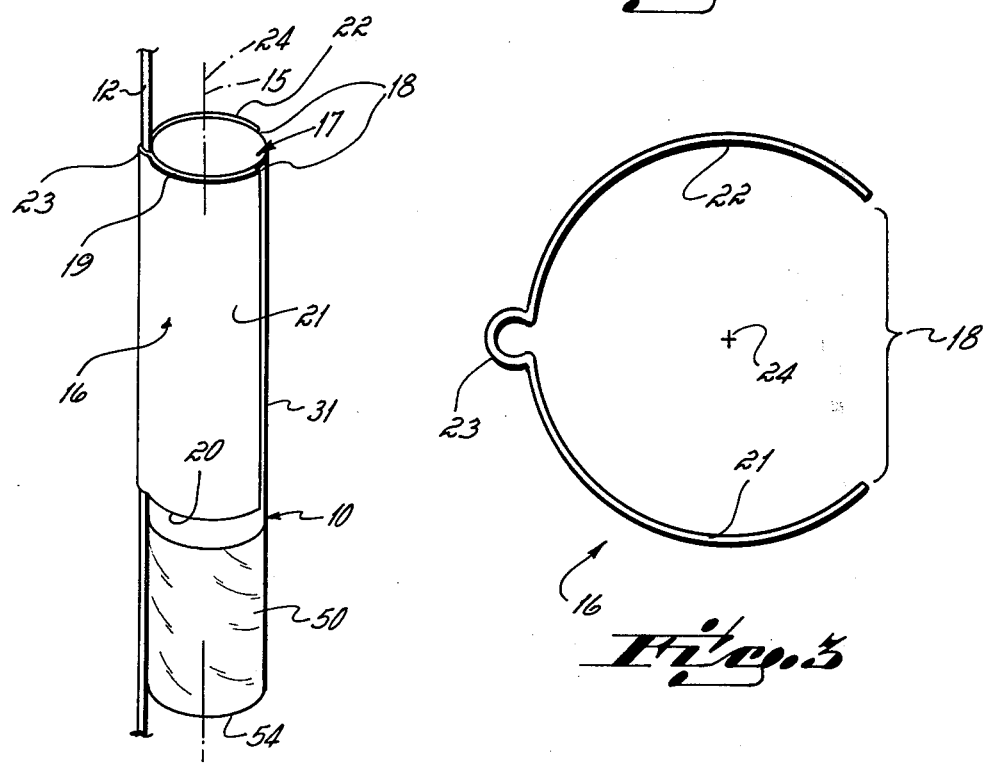

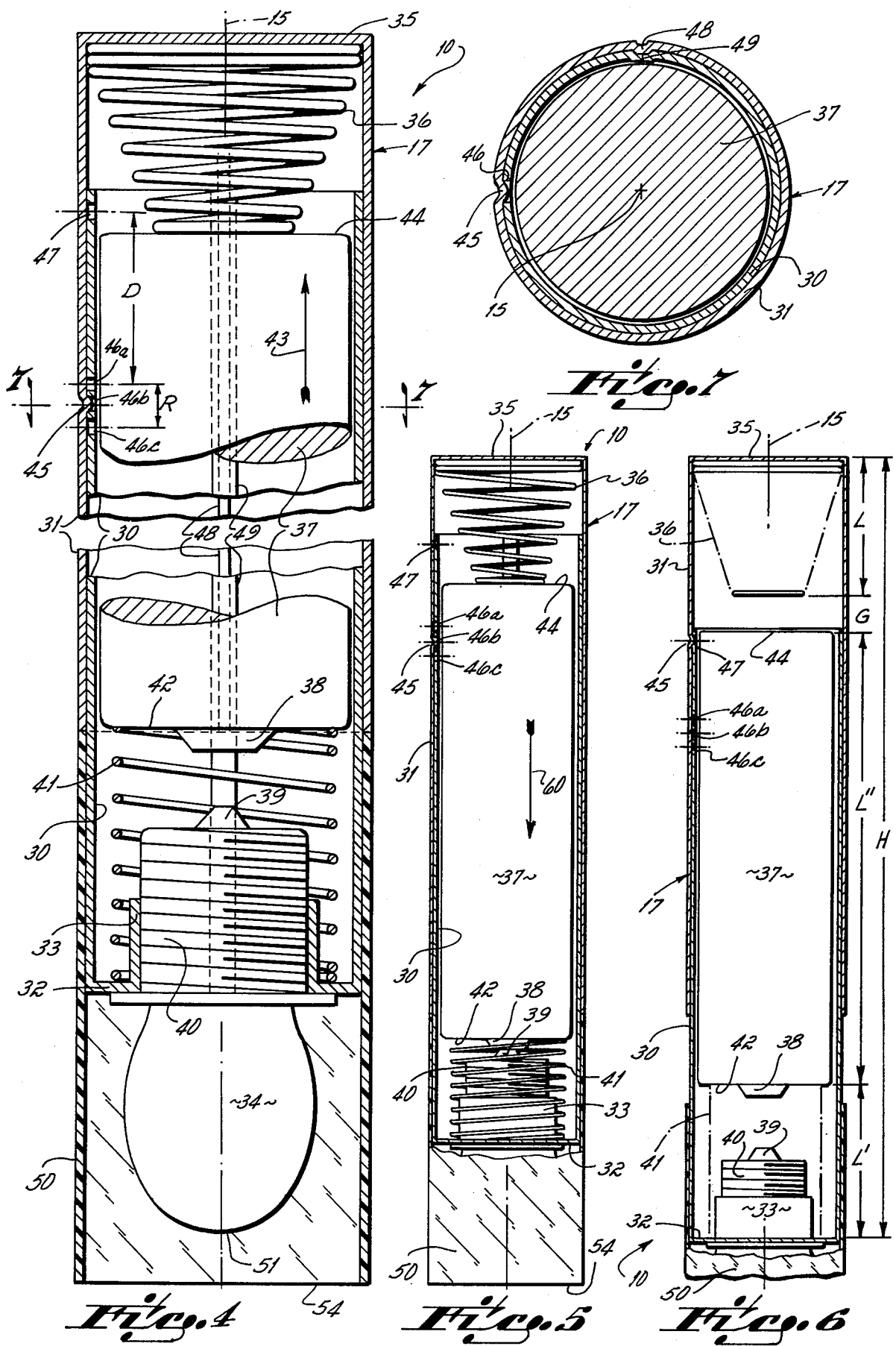

LIGHT

This invention relates to lights. More particularly, this invention relates to an improved light adapted for mounting on the wheel of, e.g., a bicycle.

Lights for bicycles are, of course, very well known to the prior art. Bicycle lights have been marketed for many, many years, and there are numerous different types of bicycle light structures. More specifically, and for example, one typical bicycle light structure is that mounted to the handlebars of the bicycle for the purposes of providing a headlight type beam at night. Use of the handlebar mounted light is much like that of an automobile's headlights, namely, to establish a lighted path for the bicycle rider at night. This headlight type bicycle light may be battery powered, or may be generator powered through a generator driven off one of the bicycle's wheels. Another type of bicycle light structure is a safety light structure having one light mounted to the bicycle's front fender and another light mounted to the bicycle's rear fender. The front and rear fender lights may be different colors, e.g., red and green, and are generally used for safety purposes. This safety light structure is usually battery powered.

A further type of bicycle light structure known to the prior art comprises lights mounted to one or both wheels of the bicycle. Such lights may be mounted to the hub of the wheel, or to the spokes of the wheel. In connection with lights mounted to the spokes of the wheel, one embodiment is illustrated in U.S. Pat. No. 3,987,409 in which a plurality of battery powered lights are attached by suitable means to the spokes of the wheels. In this battery embodiment, apparently the lights are turned on and off by a manual switch mounted on each light structure. Another embodiment is illustrated in French Pat. No. 1,068,313 in which a light mounted on spokes of a bicycle wheel is connected by a wire to a generator evidently attached to the wheel's hub. In this French embodiment, the light is on only when the bicycle is running in that the generator only generates electricity as the bike is ridden.

It has been one objective of this invention to provide an improved light adapted to mount on a wheel of, e.g., a bicycle, that light being activated to the light-on attitude in response to centrifugal force generated by the wheel as the wheel rotates, e.g., as the bicycle is ridden, and being deactivated to the light-off attitude when the wheel is not rotated, e.g., when the bicycle is stopped.

It has been a further objective of this invention to provide an improved light adapted to mount on a wheel of, e.g., a bicycle, light having a novel spring mechanism connected therewith that permits the battery itself to function as part of the light's off/on switch in response to centrifugal force generated by the wheel as the wheel rotates, e.g., as the bicycle is ridden.

It has been another objective of this invention to provide an improved light adapted to mount on a spoke of a wheel of, e.g., a bicycle, that light having a novel mounting clip that permits the light to be easily connected to the spoke.

In accord with these objectives, the improved light of this invention is adapted to be connected to a wheel of, e.g., a bicycle. In preferred form, the light is fixed to the wheel in a manner that orients the light's battery on an axis positioned substantially radially of the wheel, and that orients the light's battery radially inward of the light's bulb relative to the wheel's axis. A switch spring is provided in the light's housing that normally biases the battery out of electrical contact with the bulb when the wheel is not rotating, i.e., when the bicycle is not in use, but which permits the battery to be biased into electrical contact with the bulb in response to centrifugal force when the wheel is rotating, i.e., when the bicycle is in use. Thus, the light turns off automatically when the bicycle is not being ridden, and turns on automatically in response to centrifugal force when the bicycle is being ridden, when the light is mounted on a bicycle's wheel.

Other objectives and advantages of the invention will be more apparent from the following detailed description taken in conjunction with the drawings in which:

FIG. 1 is a perspective view of an improved light in accord with the principles of this invention, the light being mounted in operating relation on a spoke of a bicycle wheel;

FIG. 2 is an enlarged perspective view of the light as mounted on a spoke;

FIG. 3 is a top plan view of the mounting clip by which the light is attached to the spoke;

FIG. 4 is a cross-sectional view taken along the longitudinal axis of the improved light, the light being shown in the active but off attitude such as is the case when the wheel is not being rotated, i.e., when the bicycle is not being ridden;

FIG. 5 is a cross-sectional view similar to FIG. 4 but illustrating the light in the active or on attitude such as is the case when the wheel is being rotated, i.e., when the bicycle is being ridden.

FIG. 6 is a cross-sectional view also similar to FIG. 4 but illustrating the light in the inactive or manual off attitude, that inactive attitude being such that the light cannot turn on even if the wheel is being rotated, i.e., even if the bicycle is being ridden; and FIG. 7 is a cross-sectional view taken along line 7—7 of FIG. 4.

FIG. 8 is a cross-sectional view of an alternative on-off switch, the switch being shown in an off position.

The improved light 10 of this invention is illustrated in operative combination with a spoked wheel 11 (specifically, a bicycle wheel) in FIG. 1. As shown in that Figure, two lights 10 are structurally connected to two different spokes 12 of the bicycle wheel 11, the lights being disposed on spokes positioned 180° one from the other, i.e., on spokes extending substantially radially outward in opposite directions from hub 13 of the wheel. Of course, the spokes 12 of the bicycle wheel 11 also extend substantially radially outward from the center axis 14 of the wheel. Any number of lights 10 may be provided on separate spokes 12, but in practice two lights on oppositely extending spokes will give a very desirable and pleasing effect in use.

Each of the improved lights 10 is attached to a spoke 12 in a manner that orients the longitudinal axis 15 of the light parallel to the spoke, see FIGS. 1 and 2. This connection is accomplished by a mounting clip 16. Each mounting clip 16 is generally tubular in cross-sectional configuration, and is sized in cross-sectional dimension so as to establish a friction fit with the light's tubular housing, see FIGS. 2 and 3. In the embodiment shown, the exterior tubular housing 17 of the light 10, and the clip 16, are both circular in cross-sectional configuration. The clip 16 is provided with a space or gap 18 longitudinally thereof from one end 19 to the other end 20 so as to define, in effect, two arms 21, 22 located on either side of an outwardly extending rib 23 which also runs from one end of the clip to the other. The outwardly extending rib 23 is parallel to the center axis 24 of the clip 16, and is generally configured in cross section so as to admit a spoke 12 in friction fit relation between the clip and the exterior of the light housing 17, when the clip is mounted on the light housing, all as illustrated in FIGS. 1 and 2. The clip 16 may be fabricated of a relatively flexible plastic that has good memory characteristics, e.g., a polyethylene or the like, so as to provide the necessary spring characteristics for the clip's arms 21, 22 to permit assembly and disassembly of the light on a wheel's spokes 12, as well as to maintain the light 10 in friction fit relation with the clip's arms.

In assembly of the light 10 with the spoke 12 through use of the mounting clip 16, the clip is first installed in friction fit on the lights' housing 17. A spoke 12 is then simply inserted between one of the clip's arms 21 or 22 and the light's housing 17, and the light and clip then rotated about axis 15, 24 until the spoke is seated in the rib 23. Once the spoke 12 is seated in the clip's rib 23, becuase the rib is parallel to the longitudinal axis 24 of the clip 16, and because the clip's longitudinal axis is substantially coaxial with the longitudinal axis 15 of the light 10, the light itself is oriented parallel to the spoke. This, as previously mentioned, orients the light 10 in a substantially radial manner relative to the hub 13 of the bicycle wheel 11, all as illustrated in FIG. 1.

As shown in that FIG. 1, the light on the upper segment of the wheel is in a position wherein same may be mounted onto the spoke, and the light in the lower segment of the wheel is in the position wherein same attains when being rotated, i.e., when the bicycle is being ridden and centrifugal force causes the light to come to rest against the rim 52 as more fully described hereinafter.

The structure of the light 10 itself is particularly illustrated in FIGS. 4–7. As shown in those Figures, and as previously mentioned, the light 10 includes the tubular housing 17 of cylindrical cross-sectional configuration. The housing 17 is comprised of an inner or top casing section 30 and an outer or bottom casing section 31 telescopingly received in connected relation one with the other, both sections being formed of metal. The top casing section 30, at the end wall 32 thereof, defines a threaded flange 23 which extends inwardly into that top casing section, the threaded flange being adapted to receive a light bulb 34 of known type in threaded relation therewith. The threaded connection between the light bulb 34 and the flange 33 of the top casing section 30, of course, serves to mount the light bulb in seated relation with the housing. The bottom housing section 31, at closed end wall 35 thereof, carries a conical metal contact spring 36 fixed to that end wall. The conical contact spring 36 is a compression spring, and has a maximum set length L as illustrated in FIG. 6. A cylindrical battery 37 of the well known penlight type is carried within the housing 17 between the contact spring 36 and a light bulb 34, the housing being sized relative to the battery to permit sliding of the battery within the housing. The battery 37 is oriented within the housing so that the battery's button 38 is adapted to abut against contact 39 on the light bulb's base 40. The contact spring 36 serves to maintain electrical contact between the light's tubular housing 17 and the bottom face 44 of the battery 37 when the light 10 is in the light-on attitude as is illustrated in FIG. 5.

A cylindrical biasing spring 41 is interposed between the top face 42 of the battery 37 (but not in electrical contact with the battery's button 38) and the end wall 32 of the top casing section 30, that biasing spring serving to normally bias the battery in a direction illustrated by arrow 43 in FIG. 4 when the light 10 is not in the light-on attitude. The biasing spring 41 functions much in the nature of a switch to normally and automatically urge the battery 37 away from electrical contact with the light bulb 34 when the light 10 is not in use as is illustrated in FIG. 4. Thus, the biasing or switch spring 41, which is also a compression spring, must provide a sufficient spring force to overcome the spring force of the contact spring 36 when the light 10 is not in use as is described in further detail below.

The top 30 and bottom 31 casing sections are maintained in a fixed longitudinal relation, i.e., in a fixed telescoped position, one with another by means of an activator structure as illustrated in FIG. 4. This activator structure cooperates to define two primary operational attitudes for the light 10, namely, the active attitude in which the light may be on or off depending on whether the bicycle is being ridden or not, and the inactive attitude in which the light cannot go on even if the bicycle is being ridden, all as described in detail below. The activator structure includes an inwardly facing tab or detent 45 formed integral in a side all of the bottom casing section 31. Two sets 46, 47 of ports are formed in the top casing section, and those ports are all positioned on a straight line aligned parallel to the axis 15 of the housing 17. Note the active port 46 is positioned between the inactive port 47 and light bulb 34 of the light, a distance D separating same. To establish the light 10 in the active attitude, the detent 45 is received within one of the three ports 46a–46c so as to permit lighting of the light 10 as the bicycle is being ridden as explained in detail below. To establish the light 10 in the inactive attitude, the detent 45 is received within port 47 so as to prevent lighting of the light as the bicycle is being ridden as explained below. An inwardly extending tongue 48 on the bottom casing section 31 is received in groove 49 defined on the top casing section 30, the tongue and the groove of both casing sections being oriented parallel to the axis of the light's housing 17. By maintaining the tongue 48 of the bottom casing section 31 in the groove 49 of the top casing section 30, and as those casing sections are slid longitudinally relative one to another to move the detent 45 between the active attitude (i.e., the port 46 position) illustrated in FIG. 5 to the inactive attitude (i.e., the port 47 position) illustrated in FIG. 6, it is insured that alignment of the detent 45 with the respective ports 46, 47 is maintained.

A globe 50, in the form of a tubular sleeve of cylindrical cross section, is mounted on the closed end of the top casing section 30, see FIG. 4. The sleeve-like globe 50 is adapted to be fixed to that top section 30 by a tight friction fit or by glue or in any other manner known to the art. Note that the sleeve-like globe extends beyond the end 51 of the light bulb 34; it is desirable that the length of the sleeve-like globe 50 extend beyond light bulb 34 to prevent the light bulb from breaking against the wheel's rim 52 during use of the light 10. Particularly, the bottom edge 54 of the globe 50 seats against the wheel's rim 52 during use as described in detail below. The globe 50 is preferably fabricated of a transparent or translucent plastic material, and the globe may be colored or clear as desired. It is through the globe 50 that the light of the light bulb 34 is transmitted to the eye of the observer during use of the light.

Use of the light 10 of this invention is as illustrated in FIGS. 1, 4 and 5. As shown in FIG. 1, and as is more particularly shown in FIG. 2, the light 10 is first connected with, e.g., a bicycle wheel's spoke 12, through use of mounting clip 16 in a manner previously discussed in detail above. The light 10 is so connected with the spoke 12 that the battery 37 is located radially inward of the light bulb 34 relative to the wheel's axis 14. In other words, the light 10 is connected so that the sleeve-like globe 50 which surrounds the light bulb 34 is located radially closer to the wheel's rim 52 than is the battery 37 carried within the light's housing 17 relative to the wheel's axis 14. This orientation of the battery 37 vis-a-vis the light bulb 34 in mounting the light 10 is important for this embodiment of the light as will become apparent from the detailed operation description below.

Once the light 10 is mounted to the wheel's spoke 12, the housing's top 30 and bottom 31 casings are telescoped together into the active attitude shown in FIG. 4 at which detent 45 is adapted to seat in one of the ports 46. During use, it will be apparent that the bicycle wheel 11 might come to rest, after use by a rider, with the axis 15 of the light 10 at substantially any angle relative to ground level, as well as with the battery 37 either above the light bulb 34 or below the light bulb relative to ground level. Further, different brand batteries 37 used with the bicycle light 10 may be of different weights. It is for these reasons that a fine adjustment structure (i.e., holes 46a, 46b, 46c) is provided to cooperate with detent 45 in the active attitude. The detent 45 is set in that hole 46a or 46b or 46c which will insure, once the wheel 11 is brought to rest, that the compressive strength of biasing or switch spring 41 overcomes the compressive strength of contact spring 36 so that the battery 37 is pushed out of electrical contact with the light bulb 34 no matter what the spatial attitude of the safety light 10, see FIG. 4. In this connection, it is important that the distance range R between the end holes 46a and 46c on the fine adjustment structure be not of such great distance that the contact spring 36 cannot maintain electrical contact with the end face 44 of the battery 37 no matter what the spatial attitude of the light 10 as it rotates about the wheel's axis 14 as the bicycle is ridden by a user.

Alternatively, the holes 46 and detent 45 could be replaced with threads on the respective casings so as to adjust the spring pressure and, hence, accomplish the desired position of the battery contact 38 with respect to the bulb contact 39. As mounted for use in the active attitude, therefore, the longitudinal axis 15 of the light 10 (and, hence, of the battery 37) is substantially radially oriented relative to the hub 13 of the bicycle wheel 11, and the battery 37 is positioned inwardly of the light bulb 34. Further, and importantly, in the active but light-off attitude with the wheel 11 not rotating (i.e. with the bicycle not being ridden), as illustrated in FIG. 4, the switch spring 41 has pushed battery 37 out of electrical contact with the light bulb 34 so as to switch the light 10 off when the wheel is not being rotated (i.e., when the bicycle is not being ridden).

As the spoked wheel 11 is rotated with the light 10 thereon, i.e., as the bicycle is being ridden, centrifugal force acting on the light 10 causes the light to slide outwardly along the spoke 12 until end edge 54 of the globe 50 abuts rim 52 of the wheel 11 (lower segment of FIG. 1). This causes the light 10 to seat or locate, in effect, against the inside of the wheel's rim 52, and keeps the light in that rim seat attitude during use because of the abutting relation therebetween. Further, and importantly, the centrifugal force acting on the light 10 as the wheel 11 is rotated causes the battery 37 to move longitudinally of the light's housing 17, and radially outward relative to the wheel's axis 14, along a path illustrated by arrow 60 in FIG. 5. FIG. 5, therefore, illustrates the active and light-on attitude of the light's structural components when that light 10 is attached to a wheel 11 and the wheel is rotating, e.g., the bicycle is being ridden. In that FIG. 5 attitude, centrifugal force on the battery 37 overcomes the compressive strength of the switch spring 41, thereby forcing the battery's button 38 into abutting electrical contact with the light bulb's knob 39. Thus, and in response to centrifugal force generated by the wheel 11 as it rotates, e.g., upon riding of the bicycle, the battery automatically moves from the active but light-off attitude illustrated in FIG. 4, into the active and light-on attitude illustrated in FIG. 5, in response to that centrifugal force. Electrical contact is maintained between the battery 37 and the metal housing 17 during and after that battery movement by contact spring 36 so as to complete an electrical circuit that includes the light bulb 34, battery 37, contact spring 36 and housing 30, 31, thereby lighting the light bulb 34. Once the wheel 11 stops rotating, i.e., once the bicycle is stored or no longer being ridden, the switch spring 41 automatically breaks the electrical circuit by biasing the battery 37 away from the light bulb 34 into the active but light-off attitude illustrated in FIG. 4 as previously explained.

The active attitude of the light 10, as previously mentioned, is illustrated in FIGS. 4 and 5, the active attitude having a light-on posture in which the light bulb 34 is in fact lighted as illustrated in FIG. 5, and a light-off posture in which the light bulb is not lighted as illustrated in FIG. 4. The light 10 also has an inactive attitude illustrated in FIG. 6 in which the light 10 cannot be lighted even if the wheel 11 is being rotated, i.e., in which the light cannot be lighted in response to centrifugal force. This inactive attitude is established by telescoping the light's housing sections 30, 31 away from one another to locate detent 45 in the off hole 47. In this inactive attitude, switch spring 41, which is of a set length L', is adapted to fully extend to that length L' as shown in FIG. 6. The battery 37 is of a length L", and it will be recalled the contact spring is of a set length L. It will be apparent as shown in FIG. 6, that the housing's sections 30, 31 have been telescoped so as to present an overall length H greater than the combined lengths L, L', L" of the contact spring 36, switch spring 41 and battery 37, thereby establishing a gap G between any of those three component parts no matter what the spatial orientation of the light. This insures that the light 10 will remain off whether the wheel 11 is rotating or not for the reason that this insures no complete electrical circuit can be completed as the contact spring 36 and the light bulb 34 can never both contact the battery 37 at the same time in the FIG. 6 attitude. This inactive attitude of the light 10 may be used when the bicycle is being ridden in the daytime, i.e., during those hours when the light will not provide a desirable visual effect to observers, without removing the light 10 from the wheel's spoke 12.

An alternative active-inactive switch for the light 10 is illustrated in FIG. 8. As shown in that Figure, the globe 50 is slidable on casing 10. A rubber ring 70 has its outer periphery fixed to the inner surface of the globe 50. The inner race of this ring 70 is secured to the bulb 34 which, as described above, has its base 40 threaded into the casing's flange 33.

To activate the bulb 34 into a light-on posture, the globe 50 is rotated so that the threaded base of the bulb will thread itself into the flange 30. This turning of the globe will compress the spring 41 against casing end 32, and bring the bulb contact 39 into engagement with battery contact 38, thereby lighting the bulb 34. If it is desired to operate the light of this invention in the centrifugal manner as set forth above, the globe is rotated slowly in the opposite direction from the active light-on posture until the contacts 38, 39 separate to deenergize the bulb. At this position, wherein the bulb 54 has been just turned off, the light is properly adjusted for centrifugal operation. Of course, the inactive attitude for the bulb is achieved by locating the bulb as shown in FIG. 8.

Although this improved light has been described for use with a bicycle, it will be understood that the light may be used in connection with any spoked wheel. Typically, such spoked wheels are used on unicycles, motorcycles, and the like.

Having described in detail the preferred embodiments of my invention, what I desire to claim and protect by Letters Patent is:

1. A centrifugally operable light for mounting on a bicycle wheel, said light comprising
   a housing adapted to receive a battery therein,
   a light bulb carried in said housing,
   a centrifugally operable switch connecting said battery and said bulb, said switch being movable from an off position at which said light bulb is not lighted to an on position at which said light bulb is lighted in response to centrifugal force generated by rotation of said wheel, and said switch being movable from said on position back to said off position in response to the lack of centrifugal force when rotation of said wheel is stopped,
   a manually operable activator connected in operable relation with said centrifugally operable switch, said activator structure permitting selection by a user of one of (a) an active attitude for said light in which said centrifugally operable switch is rendered operative to turn said lgiht bulb on and off in response to centrifugal force generated by rotation of said wheel or the lack thereof, and (b) an inactive attitude for said light in which said centrifugally operable switch is rendered inoperative to prevent turning said light bulb on in response to centrifugal force generated by rotation of said wheel, and
   a connector adapted to connect said light to said wheel.

2. A light as set forth in claim 1, said centrifugal switch being comprised of
   a switch spring interposed between said light bulb and said battery, said switch spring normally biasing said battery away from electrical contact with said light bulb when said wheel is not rotating, and said switch spring permitting said battery to move into electrical contact with said light bulb in response to centrifugal force generated by rotation of said wheel when said wheel is rotating.

3. A light as set forth in claim 2, said light further including
   a contact spring interposed between said battery and said housing, said contact spring maintaining electrical contact between said battery and said housing when said switch is in the active light bulb on attitude.

4. A light as set forth in claim 1, said light further comprising
   fine adjustment structure connected with said switch, said fine adjustment structure permitting the response of said switch to be varied as required to maintain operability of said switch, the operational attitude of said fine adjustment structure being dependent on the weight of said battery.

5. A light as set forth in claim 1, said connector being structured to permit said light to slide along said spoke in response to centrifugal force generated by rotation of said wheel when said light is mounted on said wheel, said light sliding along said spoke until said light abuts said wheel's rim, thereby positioning said light adjacent said wheel's tire.

6. A centrifugally operable light for mounting on a bicycle wheel, said light comprising
   a housing adapted to receive a battery therein,
   a light bulb carried in said housing,
   a centrifugally operable switch connecting said battery and said bulb, said switch being movable from an off position at which said light bulb is not lighted to an on position at which said light bulb is lighted in response to centrifugal force on said battery generated by rotation of said wheel, and said switch being movable from said on position back to said off position in response to the lack of centrifugal force on said battery when rotation of said wheel is stopped,
   fine adjustment structure connected with said switch, said fine adjustment structure permitting the response of said switch to be varied as required to maintain operability of said switch, the operational attitude of said fine adjustment structure being dependent on the weight of said battery, and
   a connector adapted to connect said light to said wheel.

7. A light as set forth in claim 6, said light further including
   activator structure connected to said light, said activator structure permitting selection by a user of one of an active attitude in which said switch is movable between said light bulb on and light bulb off positions in response to centrifugal force generated by said wheel or the lack thereof, and an inactive attitude in which said switch is rendered inoperative to preclude lighting of said light bulb even if said wheel is rotated.

8. A light as set forth in claim 6, said connector being structured to permit said light to slide along said spoke in response to centrifugal force generated by rotation of said wheel when said light is mounted on said wheel, said light sliding along said spoke until said light abuts said wheel's rim, thereby positioning said light adjacent said wheel's tire.

9. A light as set forth in claim 6, said switch being comprised of
   a switch spring interposed between said light bulb and said battery, said switch spring normally biasing said battery away from electrical contact with said light bulb when said wheel is not rotating, and said switch spring permitting said battery to move into electrical contact with said light bulb in response to centrifugal force generated by rotation of said wheel when said wheel is rotating.

10. A light as set forth in claim 9, said light further including
- a contact spring interposed between said battery and said housing, said contact spring maintaining electrical contact between said battery and said housing at least when said switch is in the active light bulb on attitude.

11. A centrifugally operable light for mounting on the spokes of a bicycle wheel, said light comprising
- a housing adapted to receive a battery therein,
- a light bulb carried in said housing,
- a centrifugally operable switch connecting said battery and said bulb, said switch being movable from an off position at which said light bulb is not lighted to an on position at which said light bulb is lighted in response to centrifugal force generated by rotation of said wheel, and said switch being movable from said on position back to said off position in response to the lack of centrifugal force when rotation of said wheel is stopped, and
- a connector adapted to connect said light to a spoke of said wheel, said connector being structured to permit said light to slide along said spoke in response to centrifugal force generated by rotation of said wheel when said light is mounted on said wheel, said light sliding along said spoke until said light abuts said wheel's rim, thereby positioning said light adjacent said wheel's tire.

12. A light as set forth in claim 11, including
- activator structure connected to said light, said activator structure permitting selection by a user of one of an active attitude in which said switch is movable between said light bulb on and light bulb off positions in response to centrifugal force generated by said wheel or the lack thereof, and an inactive attitude in which said switch is rendered inoperative to preclude lighting of said light bulb even if said wheel is rotated.

13. A light as set forth in claim 11, said light further comprising
- fine adjustment structure connected with said switch, said fine adjustment structure permitting the response of said switch to be varied as required to maintain operability of said switch, the operational attitude of said fine adjustment structure being dependent on the weight of said battery.

14. A light as set forth in claim 11, said centrifugal switch being comprised of
- a switch spring interposed between said light bulb and said battery, said switch spring normally biasing said battery away from electrical contact with said light bulb when said wheel is not rotating, and said switch spring permitting said battery to move into electrical contact with said light bulb in response to centrifugal force generated by rotation of said wheel when said wheel is rotating.

15. A light as set forth in claim 14, said light further including
- a contact spring interposed between said battery and said housing, said contact spring maintaining electrical contact between said battery and said housing at least when said switch is in the active light bulb on attitude.

16. A centrifugally operable light for mounting on a bicycle wheel, said light comprising
- a housing adapted to receive a battery therein, the longitudinal axis of said battery being generally radially oriented relative to the hub of said wheel when said light is mounted on said wheel,
- a light bulb carried in said housing, said light bulb being positioned radially outward of said battery when said light is mounted on said wheel,
- a switch spring operably connecting said battery and said bulb, said battery being movable along its longitudinal axis against the bias of said spring from an off position at which said light bulb is not lighted to an on position at which said light bulb is lighted in response to centrifugal force on said battery generated by rotation of said wheel, and said battery being movable along its longitudinal axis in response to the bias of said spring from said on position back to said off position in response to the lack of centrifugal force on said battery when rotation of said wheel is stopped, and
- a connector adapted to connect said light to said wheel, said connector being structured to permit said light to slide along said spoke in response to centrifugal force generated by rotation of said wheel when said light is mounted on said wheel, said light sliding along said spoke until said light abuts said wheel's rim, thereby positioning said light adjacent said wheel's tire.

17. A centrifugally operable light for mounting on a bicycle wheel, said light comprising
- a housing adapted to receive a battery therein, the longitudinal axis of said battery being generally radially oriented relative to the hub of said wheel when said light is mounted on said wheel,
- a light bulb carried in said housing, said light bulb being positioned radially outward of said battery when said light is mounted on said wheel,
- a switch spring operably connecting said battery and said bulb, said battery being movable along its longitudinal axis against the bias of said spring from an off position at which said light bulb is not lighted to an on position at which said light bulb is lighted in response to centrifugal force on said battery generated by rotation of said wheel, and said battery being movable along its longitudinal axis in response to the bias of said spring from said on position back to said off position in response to the lack of centrifugal force on said battery when rotation of said wheel is stopped,
- a manually operable activator connected in operable relation with said centrifugally operable switch, said activator structure permitting selection by user of one of (a) an active attitude for said light in which said centrifugally operable switch is rendered operative to turn said light bulb on and off in response to centrifugal force generated by rotation of said wheel or the lack thereof, and (b) an inactive attitude for said light in which said centrifugally operable switch is rendered inoperative to prevent turning said light bulb on in response to centrifugal force generated by rotation of said wheel, and
- a connector adapted to connect said light to said wheel.

* * * * *